July 21, 1970    W. OSTREICHER    3,521,147
REGULATED VOLTAGE SUPPLY CIRCUIT

Filed March 22, 1968    2 Sheets-Sheet 1

INVENTOR.
Werner Ostreicher

BY Laurence R. Brown

July 21, 1970    W. OSTREICHER    3,521,147
REGULATED VOLTAGE SUPPLY CIRCUIT
Filed March 22, 1968    2 Sheets-Sheet 2

INVENTOR.
Werner Ostreicher
BY
Laurence R. Brown

United States Patent Office 3,521,147
Patented July 21, 1970

3,521,147
REGULATED VOLTAGE SUPPLY CIRCUIT
Werner Ostreicher, Teningen, Baden, Germany, assignor to Messrs. Frako Kondensatoren- und Apparatebau G.m.b.H., Teningen, Baden, Germany, a corporation of Germany
Filed Mar. 22, 1968, Ser. No. 715,409
Claims priority, application Germany, Mar. 22, 1967, F 51,914
Int. Cl. H02m 7/02; H02j 7/26; G05f 3/06
U.S. Cl. 321—16                                          6 Claims

ABSTRACT OF THE DISCLOSURE

A regulated power supply circuit utilizes a constant voltage transformer circuit with a resonating condenser coupled to one transformer secondary winding and a rectifier circuit connected to another secondary winding and having a condenser or battery at its output end to set up a counter voltage. In one embodiment a directed magnetic flux path exists in the transformer and in another a saturable choke in series with the primary winding is used.

---

This invention relates to a regulated power supply circuit and, more particularly, to one with a saturable constant voltage transformer circuit feeding the rectifier.

In the present invention a separate secondary winding from the rectifier winding is provided for connection in parallel with a resonance condenser and a counter voltage is developed by a condenser or battery at the rectifier output end. A saturable core is provided with means in the primary winding circuit to prevent saturation until full load condition is reached. In one embodiment the transformer has a directed flux path of increased reluctance arranged through a portion of a saturable magnetic transformer core. In another embodiment a choke coil is used in series circuit with the transformer primary winding.

Prior art circuits for regulated voltage supplies are known (DBP 1,077,318) operable to prevent output direct current variations at the exit end of a rectifier within given ranges of load current and line voltage variations. These transformers operate with magnetically saturated cores under zero load conditions, and a single output winding has a resonance condenser connected in parallel therewith. However, this system requires a choke coil in series with the primary winding of the transformer which does not become fully saturated until the rectifier circuit is under full load. Also, the secondary alternating current circuit and the direct current rectifier output circuit require choke coils to permit regulation over a variable range of characteristics.

Other prior art circuits (DAS 1,149,809) use constant voltage transformers with a flux path of increased magnetic reluctance between the windings, and having laminations with directional magnetic selectivity. These circuits also require choke coils in the secondary alternating current circuit as well as in the output circuit of the rectifier to provide for an appropriate range of output regulation.

It is therefore an object of this invention to create an improved and simplifier regulated power supply of the types mentioned.

Another object of the invention is to eliminate the necessity for choke coils in the secondary A.C. and output D.C. circuits of such power supplies.

A further object of the invention is to provide regulated power supplies which can be manufactured less expensively than these known types of prior art circuits.

These objectives are achieved by this invention by use of a transformer with a resonance winding separate from the primary and secondary windings. The secondary winding and the resonance windings are so arranged on the transformer core to produce an increased dispersion inductance between them. In this construction the two said windings may be either wound next to each other on the transformer core or separated on different parts of the core. This circuit provides the unexpected advantage that choke coils in the output circuit of the transformer can be eliminated. To adjust a variation of output characteristics of this regulation circuit the resonance circuit may include either taps on the winding or a variable resonance condenser.

The following description more clearly explains the invention with reference to the several cited embodiments of the invention shown in the drawings, wherein.

Figure 1:
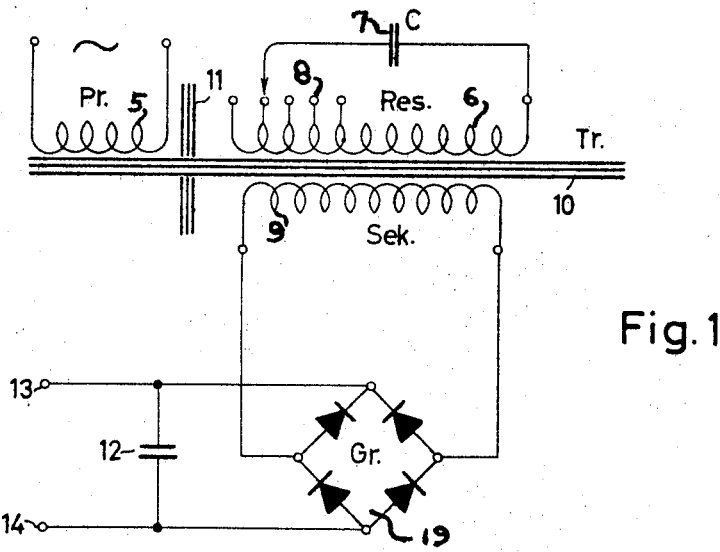
FIG. 1 is a circuit diagram of a regulated voltage supply circuit embodiment with a constant voltage transformer having a magnetic dispersion core.

In FIG. 1 a constant voltage transformer 10 is provided with means 11 for controlling saturation of the core, comprising in this embodiment a flux path of higher reluctance than the transformer core in the winding mutual inductance path. The primary winding 5 is coupled with an alternating current source such as a power line network.

The transformer 10 has a separate secondary transformer winding 6 used exclusively as a resonance winding by means of condenser 7 connected in parallel. The variable taps 8 are provided for selectively connecting the condenser at different inductance values to control the resonant characteristics of the tank circuit.

A load circuit secondary winding 9 on the transformer is coupled to a rectifier bridge circuit 19, which feeds a direct current load device (not shown) at terminals 13 and 14 in the output end. The sole filtration circuit at the rectifier output end is a condenser 12 which is charged by peak output voltage from the rectifier bridge 19 to develop a stabilizing counter voltage at the output terminals 13, 14 during operation. This feature is important in functioning of this invention.

Figure 2:
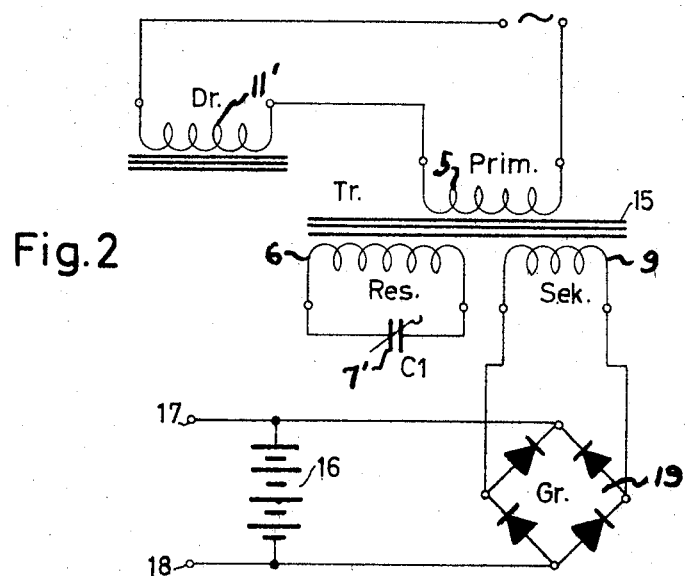
FIG. 2 is a circuit diagram of a regulated voltage supply circuit embodiment in which the primary winding has a series choke coil.

In the further circuit embodiment of FIG. 2, a constant voltage transformer 15 is used with a choke coil 11' as means for controlling saturation of the transformer in its regulation action. The choke coil 11' is connected in series with the primary winding 5 of the transformer across the alternating current source. The choke coil 11' is preferably designed so that it does not become saturated until the rectifier circuit is fully loaded. The iron core of the transformer may be constructed in a conventional manner for attaining constant voltage operation.

This transformer of FIG. 2 also has in accordance with this invention a separate resonance secondary winding 6 to which condenser 7' is connected in parallel. The value of the capacity of this condenser 7' may be variable to render an adjustable output characteristic of the circuit.

The secondary load winding 9 is arranged on the transformer core with the resonance winding 6 so that an increased dispersion inductance is set up between them, such as winding them side to side on the core with a space between them, or by winding them on different legs of the transformer core.

In the embodiment of FIG. 2, the rectifier bridge 19 is connected to output terminals 17, 18 for connection of a load device. Here a stabilizing counter voltage is set up in the form of a direct current storage battery 16. This also has the advantage of providing a D.C. supply to the load in the event of line voltage failure.

Figure 3:
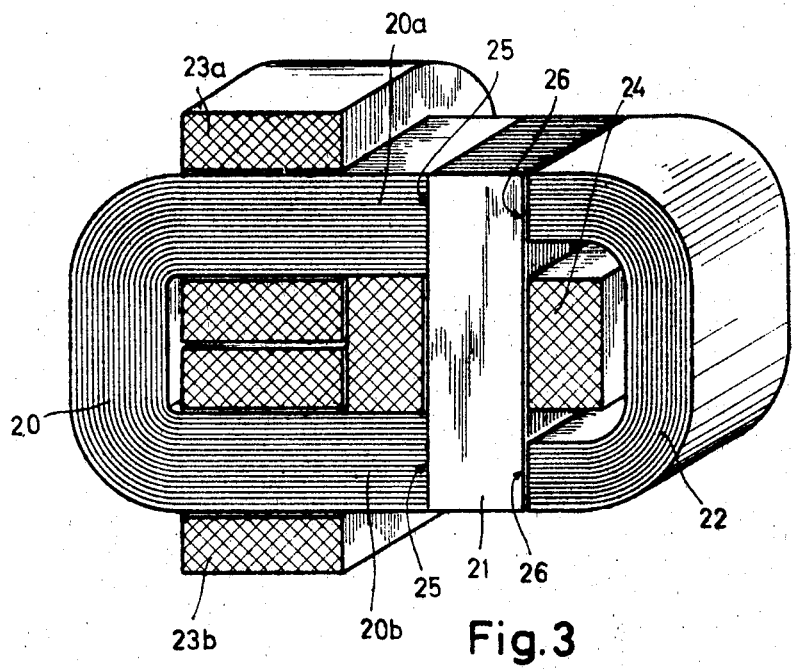
FIG. 3 is a perspective view, partly in section, of a constant voltage transformer embodiment with magnetic diversion paths.

An example of the construction of a constant voltage transformer useful with this invention is shown in FIG. 3. In this case the transformer laminations have selective magnetic direction. The U-shaped core 20 has wound thereon respectively on separate legs 20a and 20b the resonance winding 23a and the secondary winding 23b. By this arrangement an increased dispersion inductance becomes manifest between windings 23a and 23b.

Figure 4:
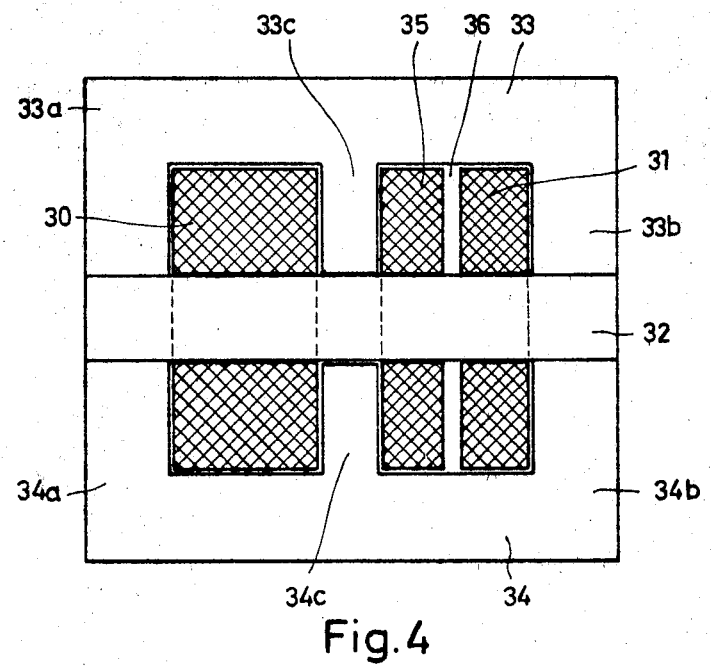
FIG. 4 is an elevation view, partly in section, of a different constant voltage transformer embodiment.

Another constant voltage transformer design is shown in FIG. 4, which has a core not constructed of laminations with magnetic directional selectively. The laminations of the transformer core are of common magnetic sheet metal. The transformer consists of two E-shaped core parts 33 and 34, with arms 33a, 33b and 33c as well as 34a, 34b and 34c. These E-shaped core parts 33 and 34 are attached to a straight core part 32, in which air gaps occur between the straight core part 32 and arms 33c and 34c to form the magnetic dispersion path of increased magnetic reluctance.

The primary winding is 30, and the resonance winding 31 has a resonance condenser connected to it. The secondary winding 35 is connected to the input end of a rectifier bridge 19 as shown in FIG. 1.

Actually any type of constant voltage transformer may be employed in this invention. It is essential, however, that a transformer have a separate resonance winding with a condenser connected in parallel and that a stabilizing counter voltage be set up at the output end of the rectifier circuit, as provided, for example, by the illustrated embodiments by means of a condenser or a storage body. Any suitable direct current source may also be employed.

Having therefore described the invention and its operation in different embodiments, those features of the invention believed descriptive of the nature and spirit of the invention are defined with particularity in the appended claims.

What is claimed is:
1. A regulated power supply circuit including a constant voltage transformer with a saturable core having a primary winding comprising in combination, a magnetically saturable iron core, two separate secondary windings one having a resonance condenser connected in parallel therewith and the other connected to a rectifying circuit each about a saturable portion of said core, means operable with the transformer to permit part of the magnetic flux to saturate one secondary winding to the exclusion of the other, means establishing a direct current counter voltage at the output end of said rectifying circuit, and a transformer construction with the resonance winding separated from the primary winding and the winding connected to the rectifying circuit and so arranged on the transformer core that an increased dispersion inductance results between the windings.

2. A circuit as defined in claim 1, wherein the means permitting the flux to saturate one winding comprises a choke coil connected in series with the primary winding of the transformer.

3. A circuit as defined in claim 1, wherein the winding connected to the rectifying circuit and the resonance winding are separate coils wound alongside each other onto a core portion of the transformer with spacings between them.

4. A circuit as defined in claim 1, wherein a portion of the transformer core is U-shaped and the winding connected to the rectifying circuit and the resonance winding are wound on separate legs of the U-shaped core portion.

5. A circuit as defined in claim 1, including taps on the resonance winding for selectively coupling different members of turns to the condenser.

6. A circuit as defined in claim 1, including means varying the capacity of the resonance condenser.

References Cited

UNITED STATES PATENTS

| | | | |
|---|---|---|---|
| 2,207,234 | 7/1940 | Böhm | 323—60 X |
| 2,469,960 | 5/1949 | Gilson et al. | 323—60 X |
| 2,804,588 | 8/1957 | Hjermstad | 321—16 |
| 3,090,904 | 5/1963 | Jensen | 323—60 X |
| 3,205,425 | 9/1965 | Moyer | 321—25 X |
| 3,389,329 | 6/1968 | Quirk et al. | 323—48 X |

J D MILLER, Primary Examiner

W. H. BEHA, JR., Assistant Examiner

U.S. Cl. X.R.

320—39; 321—25; 323—60